No. 809,148. PATENTED JAN. 2, 1906.
C. SPINLER.
TRAP.
APPLICATION FILED JUNE 10, 1905.
2 SHEETS—SHEET 1.
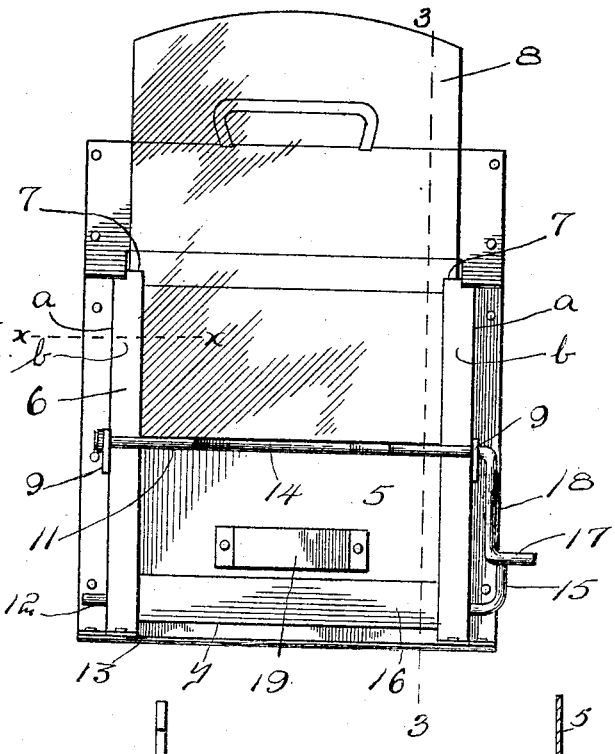
Fig. I.
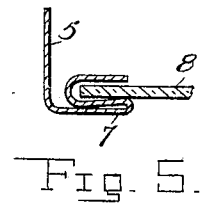
Fig. 5.
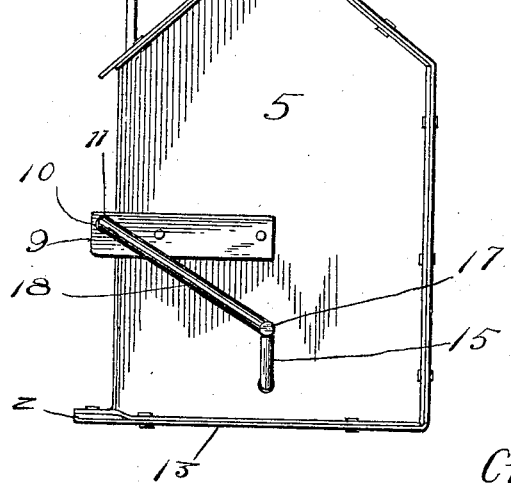
Fig. 2.
Witnesses
J. C. Simpson
E. M. Colford
Inventor
Charles Spinler
By Chandler & Chandler
Attorneys No. 809,148. PATENTED JAN. 2, 1906.
C. SPINLER.
TRAP.
APPLICATION FILED JUNE 10, 1905.
2 SHEETS—SHEET 2.
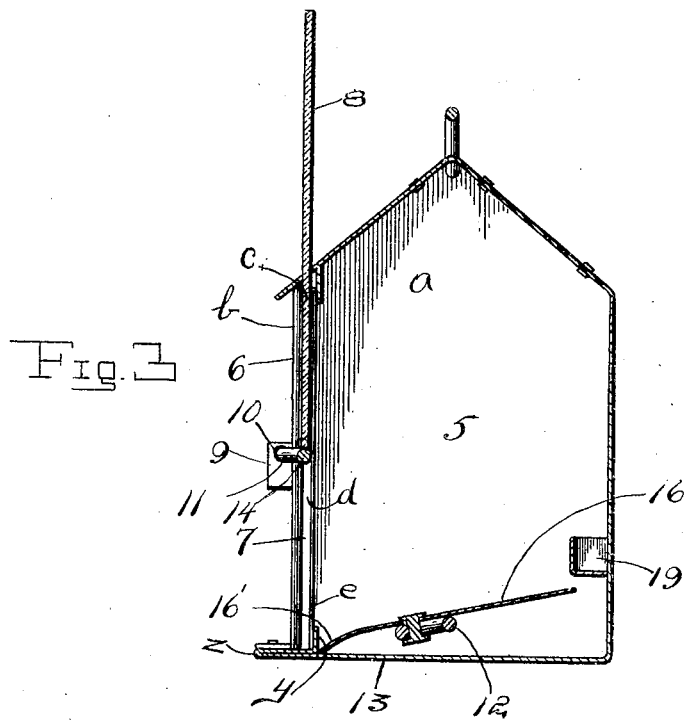
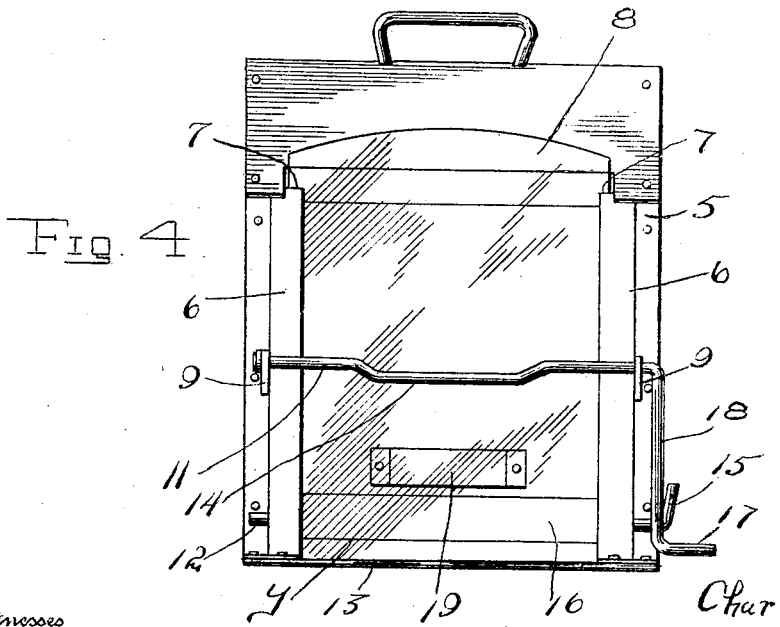
Witnesses
J. C. Simpson.
E. M. Colford.
Inventor
Charles Spinler.
By Chandler & Chandler
Attorneys

UNITED STATES PATENT OFFICE.

CHARLES SPINLER, OF BLOOMING PRAIRIE, MINNESOTA.

TRAP.

No. 809,148.      Specification of Letters Patent.      Patented Jan. 2, 1906.

Application filed June 10, 1905. Serial No. 264,637.

*To all whom it may concern:*

Be it known that I, CHARLES SPINLER, a citizen of the United States, residing at Blooming Prairie, in the county of Steele, State of Minnesota, have invented certain new and useful Improvements in Traps; and I do hereby declare the following to be a full, clear, and exact description of the invention, such as will enable others skilled in the art to which it appertains to make and use the same.

This invention relates to traps, and more particularly to those which catch and hold an animal without injuring or killing it, and has for its object to provide a trap of this kind which will be extremely simple and cheap, but which will also be efficient in operation.

Other objects and advantages will be apparent from the following description, and it will be understood that changes in the specific construction shown and described may be made within the scope of the claims and that any suitable materials may be used without departing from the spirit of the invention.

In the drawings, forming a portion of this specification, and in which like characters of reference indicate similar parts in the several views, Figure 1 is a front elevation of the present trap set. Fig. 2 is an end view showing the arm of the crank-shaft engaged with the trigger to hold the door raised. Fig. 3 is a transverse vertical section on line 3 3 of Fig. 1. Fig. 4 is a view similar to Fig. 1, showing the door lowered. Fig. 5 is a section of one of the guides, taken on line $x\,x$ of Fig. 1.

Referring now to the drawings, the present trap includes a hollow body portion 5, open at its forward face 6 and having vertical guides 7 at opposite sides of its opening, in which there is slidably mounted a door 8, movable vertically.

Plates 9 are secured to the ends of the body portion and extend beyond the forward side thereof, the outwardly-extending portions being provided with registering perforations 10, in which there is journaled a horizontal shaft 11, having a crank 14 therein between the plates, and this shaft is movable to bring its crank into and out of the path of movement of the door 8.

A longitudinally-extending shaft 12 is journaled adjacent to its ends in the ends of the body portion and lies close to the bottom 13 of the body portion, and at one end this shaft 12 is turned at an angle to form a trigger 15.

A trip-plate 16 is secured to the shaft 12 within the body portion, and this trip-plate is movable with the shaft to bring the forward and rearward edges of the plate alternately into engagement with the bottom 13 of the body portion, and when the forward edge 16′ of the plate is in engagement with the body portion the plate has a rearward and upward slant, as will be readily understood, and the trigger 15 extends upwardly in a vertical plane. In its vertical position the trigger 15 is adapted to receive upon its upper end the outwardly-turned end portions 17 of an arm 18, which is carried by the shaft 11 at one of its ends and which is formed integral with this shaft, and when this end portion of the arm is resting upon the trigger the crank 14 of the shaft 11 extends inwardly into the path of movement of the door 8 and receives the lower edge of the door thereupon to hold the door in raised position for the passage of animals therebeneath into the body portion.

When an animal entering the body portion passes rearwardly of the shaft 12 in an effort to reach a bait-rack 19, secured to the rearward wall of the body portion, the rearward portion of the trip-plate 16 is depressed to move the trigger from beneath the end portion of the arm 18, when the weight of the door will move the crank 14 out of the way and the door will descend to prevent the egress of the animal. The door 8 is perfectly formed of grating or other material through which the interior of the body portion may be seen.

The body portion is formed of sheet metal, and the guides 7 are formed by bending the forward edge portions of the ends of the body portion, which are indicated at $a$, inwardly at right angles and toward each other, as shown at $b$, these portions being then bent upon themselves and against their inner faces, as shown at $c$, and then curved rearwardly, as shown at $d$, the edge portions being finally turned inwardly to form portions $e$, lying parallel with and spaced from the portions $b$ and $c$.

The walls of the body portion are secured at their lower edges to the bottom 13, and the forward edge portion of this bottom is bent inwardly upon itself, as shown at $z$, and then upwardly at right angles, as shown at $y$, the portion $y$ resting against the rearward faces of the portions $e$ at the bottoms thereof, and thus lying inwardly of the door 8 when the latter is in closed position to keep an animal within the body portion from raising the door by inserting its nose or claws therebeneath.

What is claimed is—

1. In a trap the combination with a body portion having an opening therein, of a closure for the opening arranged for vertical movement into and out of operative position, a revoluble crank-shaft disposed across the opening for movement to bring its crank into and out of the path of movement of the door, said crank being adapted to receive the door thereupon to support the latter, means for holding the crank-shaft with its crank in position to support the door, and means operable by an animal within the body portion for moving the shaft-holding means out of operative position.

2. A trap comprising a body portion having an opening therein and having guides at the sides of the opening, a door slidably mounted in the guides for movement into and out of position to close the opening, a revoluble crank-shaft disposed for movement to bring its crank into and out of position to receive the door thereupon to hold the door in inoperative position, said door being arranged to move into operative position when the crank is moved out of position to support the door, means for holding the shaft with its crank in operative position, a trip-plate within the body portion, a trigger connected with the trip-plate and an arm carried by the crank-shaft, said trigger being adapted to receive the arm thereupon at times to hold the crank-shaft with its crank in operative position, said trip-plate being operable by an animal within the body portion to bring the trigger out of operative position.

3. A trap comprising a body portion having an opening therein, vertical guides located at the sides of the opening, a bottom for the body portion comprising a metallic plate having its forward edge portion bent inwardly upon itself and then upwardly, the upwardly-bent portion lying inwardly of the guides and a door slidably mounted in the guides, said door being arranged to lie with its lower edge forwardly of the upwardly-turned portion of the bottom and in close relation thereto when the door is in closed position.

4. In a trap the combination with a body portion having an opening therein, of a door movable into and out of position to close the opening, a crank-shaft arranged for movement into and out of the path of movement of the door said crank when in the path of movement of the door being arranged to hold the latter in inoperative position, an arm carried by the crank-shaft, a second shaft journaled in the body portion, a trigger carried by the second shaft and adapted to receive the arm of the crank-shaft thereupon to hold the crank-shaft with its crank in the path of movement of the door, a trip-plate mounted upon the second-named shaft within the body portion and lying with its forward edge portion depressed when the trigger is in position to receive the arm thereupon, said trip-plate being adapted to receive weight upon its rearward portion to remove the trigger out of operative position and a bait-holder within the body portion adjacent to the rearward portion of the trip-plate.

In testimony whereof I affix my signature in presence of two witnesses.

CHARLES SPINLER.

Witnesses:
J. C. BRAINERD,
SAM. A. LASY.